United States Patent
Kjeldsteen et al.

(10) Patent No.: US 8,698,360 B2
(45) Date of Patent: Apr. 15, 2014

(54) PERMANENT MAGNET, AND METHOD FOR MANUFACTURING A PERMANENT MAGNET

(75) Inventors: Peter Kjeldsteen, Alestrup (DK); Allan Ivo Sogaard Sorensen, Hobro (DK); Flemming Buus Bendixen, Hobro (DK)

(73) Assignee: Grundfos Management a/s, Bjerringbro (DK)

( * ) Notice: Subject to any disclaimer, the term of this patent is extended or adjusted under 35 U.S.C. 154(b) by 424 days.

(21) Appl. No.: 13/133,728

(22) PCT Filed: Dec. 11, 2009

(86) PCT No.: PCT/EP2009/008897
§ 371 (c)(1),
(2), (4) Date: Jun. 9, 2011

(87) PCT Pub. No.: WO2010/066455
PCT Pub. Date: Jun. 17, 2010

(65) Prior Publication Data
US 2011/0241469 A1    Oct. 6, 2011

(30) Foreign Application Priority Data
Dec. 12, 2008   (WO) .............. PCT/DK2008/000433

(51) Int. Cl.
*H02K 15/12*   (2006.01)
(52) U.S. Cl.
USPC ........................................ 310/44; 310/156.38
(58) Field of Classification Search
USPC ............... 310/43–44, 156.01, 156.38, 261.1
See application file for complete search history.

(56) References Cited

U.S. PATENT DOCUMENTS

| | | | | |
|---|---|---|---|---|
| 4,086,508 A | * | 4/1978 | Masumoto et al. | 310/86 |
| 6,432,554 B1 | | 8/2002 | Barber et al. | |
| 7,075,203 B2 | * | 7/2006 | Kuwert | 310/156.13 |
| 7,579,723 B2 | * | 8/2009 | Toyoda et al. | 310/44 |
| 2003/0062789 A1 | * | 4/2003 | Stuart et al. | 310/156.48 |
| 2004/0195924 A1 | * | 10/2004 | Kuwert | 310/156.13 |
| 2004/0251761 A1 | * | 12/2004 | Hirzel | 310/156.25 |

(Continued)

FOREIGN PATENT DOCUMENTS

| | | |
|---|---|---|
| CN | 1768397 A | 5/2006 |
| EP | 1235324 A2 | 8/2002 |

(Continued)

OTHER PUBLICATIONS

Office Action issued Jun. 25, 2013 in CN Application No. 200980143833.0.

(Continued)

*Primary Examiner* — Thanh Lam
(74) *Attorney, Agent, or Firm* — Panitch Schwarze Belisario & Nadel LLP

(57) ABSTRACT

A permanent magnet, in particular a permanent magnet rotor for a machine, includes a first sleeve, a first cap and a second cap arranged to close off an inner opening of the first sleeve, and a permanent magnet material formed in the inner opening of the sleeve between the first cap and the second cap. The permanent magnet material is a compressed, non-bonded powder material including hard magnetic powder material, soft magnetic powder material, or a combination of hard and soft magnetic powder material. A method for manufacturing a permanent magnet rotor is also provided.

8 Claims, 11 Drawing Sheets

(56) References Cited

U.S. PATENT DOCUMENTS

| | | | |
|---|---|---|---|
| 2007/0024147 A1* | 2/2007 | Hirzel | 310/191 |
| 2007/0241622 A1* | 10/2007 | Toyoda et al. | 310/44 |
| 2009/0072639 A1* | 3/2009 | Seneff et al. | 310/43 |

FOREIGN PATENT DOCUMENTS

| | | | |
|---|---|---|---|
| EP | 1671723 | A2 | 6/2006 |
| EP | 1722457 | A2 | 11/2006 |
| EP | 1820587 | A1 | 8/2007 |
| FR | 2625852 | A1 | 7/1989 |
| FR | 2684028 | A1 | 5/1993 |
| WO | 2005062737 | A2 | 7/2005 |
| WO | 2007024184 | A1 | 3/2007 |

OTHER PUBLICATIONS

Int'l Search Report Issued Mar. 15, 2010 in Int'l Application No. PCT/EP2009/008897.

* cited by examiner

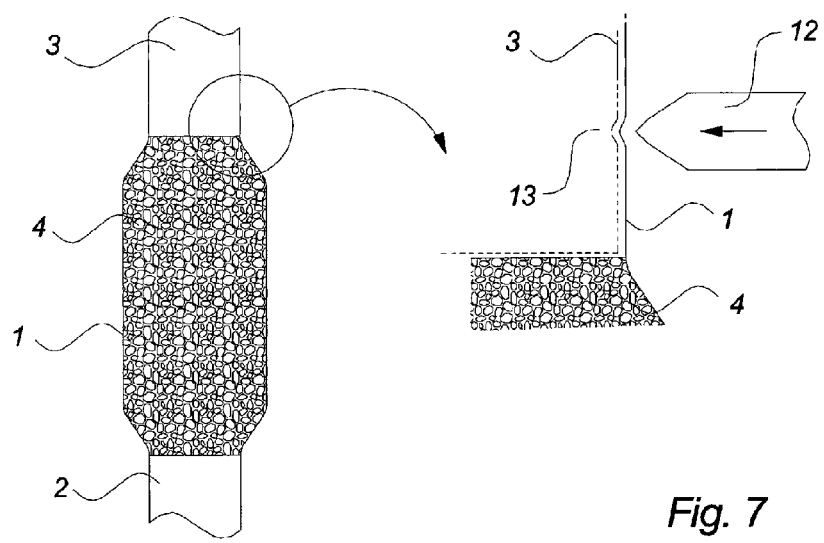
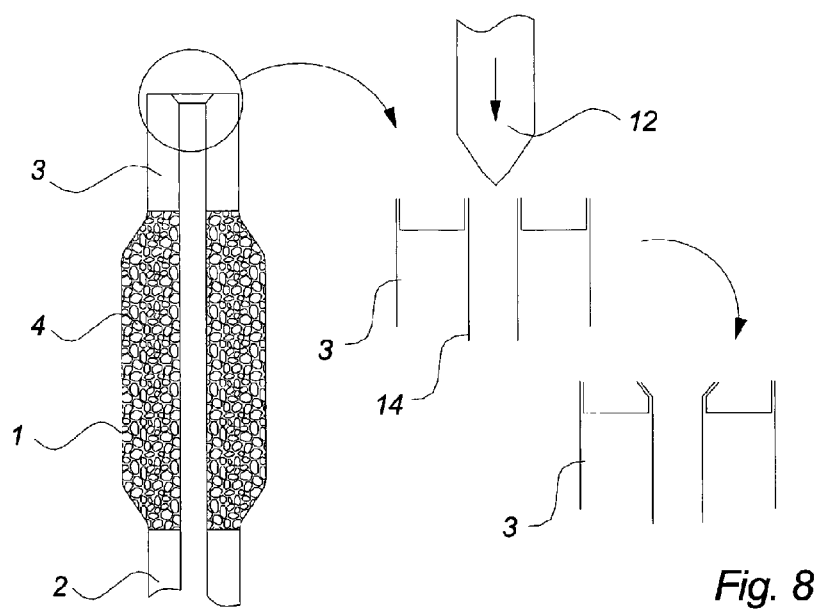
Fig. 7
Fig. 8

PERMANENT MAGNET, AND METHOD FOR MANUFACTURING A PERMANENT MAGNET

CROSS-REFERENCE TO RELATED APPLICATIONS

This application is a Section 371 of International Application No. PCT/EP2009/008897, filed Dec. 11, 2009, which was published in the English language on Jun. 17, 2010, under International Publication No. WO 2010/066455 A1 and the disclosure of which is incorporated herein by reference.

BACKGROUND OF THE INVENTION

The present invention relates to a permanent magnet and in particular to a permanent magnet rotor for an electric machine.

The invention also relates to a method for manufacturing such a permanent magnet.

In a preferred embodiment the permanent magnet according to the invention is a permanent magnet rotor for a machine.

Many different types of permanent magnetic materials to be used in rotors are available on the market. Which material to select often depends on a balancing between the desired magnetic strength of the rotor and the price of the materials for the rotor, e.g. the magnetic powder. Furthermore, many other parameters, such as corrosion, temperature, the workpoint of the magnet, etc., will influence the choice of selection.

Available permanent magnetic materials comprise ferrites and NdFeB, SmCo or AlNiCo. Magnets made of these materials can be manufactured in many ways, but the most selected ways are sintering, injection molding or bonding.

Sintered magnets are made by compressing the magnetic powder under high pressure, followed by sintering in a suitable furnace.

Bonded magnets are made of a composite of a magnetic powder comprising a binder. The permanent magnet is formed by compressing the composite in a mold. European patent application publication EP 1 722 457 A2 discloses a motor with a rotor comprising a bonded magnet of this type.

Disadvantages of using the mentioned magnets in rotors are that sintered magnets are generally relatively expensive to manufacture due to a complicated manufacturing process, and bonded magnets are generally not as efficient as sintered, e.g. due to their content of non-magnetic binder material.

BRIEF SUMMARY OF THE INVENTION

It is an object of the present invention to provide an advantageous permanent magnet without the described disadvantages and with higher magnetic strength. A further object is to provide an advantageous method for manufacturing a permanent magnet rotor.

The permanent magnet according to the invention has a structure made of a compressed, non-bonded magnetic powder material. This means that there is no special binder mixed with the powder material and no sintering is used. The magnetic powder material is just pressed into the desired shape. The magnetic powder material is a hard and/or soft magnetic powder material, preferably a hard magnetic powder material only. After pressing and forming the powder material into the desired shape, magnetic poles may be defined in the material by magnetizing the magnet. Thus, it is possible to produce one or more magnetic poles in the permanent magnet according to the invention.

As explained above the magnetic powder material is non-bonded, i.e. it does not comprise a binder material. It is just pressed together. A pressure that is higher than the pressure used in the production of prior art may be applied. This pressure may be more than 1000 MPa, preferably more than 1500 MPa up to 2000 MPa or more.

Preferably the surface of the magnetic powder material, i.e. the compressed magnetic powder material, may be at least partly and preferably completely covered by a cover material and/or have received a surface treatment. Such cover material or surface treatment provides a protection of the surface necessary to use the magnet. This surface treatment and/or cover material may give the magnet the required mechanical strength. Moreover, the magnet may become more resistant to the environment that is applied, i.e. humid air. The cover material may be a cover or sleeve surrounding the magnetic powder material, for example a sleeve made of steel and in particular stainless steel. The surface treatment may be, for example, a coating of the surface, for example by spraying a coating layer onto the surface or at least a part of the surface of the compressed powder material.

In a preferred embodiment the magnetic powder material is completely sealed to the outside, i.e. completely contained inside a cover material, for example a sleeve.

The magnetic powder material may be pressed into a sleeve. Thus, the sleeve may additionally define the shape of the finished magnet. However, it may also be possible to arrange the sleeve inside a die, so that the sleeve is brought into the shape of the die, when the magnetic powder material is pressed inside the sleeve with a high pressure as mentioned above.

Preferably, the permanent magnet is a permanent magnet rotor for a machine. Such a permanent magnet rotor for a machine may comprise a first sleeve, a first cap and a second cap arranged to close off an inner opening of the first sleeve, a permanent magnet formed in the inner opening of the sleeve between the first cap and the second cap and including a compressed, non-bonded magnetic powder material comprising hard magnetic powder material and/or soft magnetic powder material or a combination of hard and soft magnetic powder materials.

The term "machine" includes generators, as well as electric motors, magnet couplings, magnetic gears, or linear actuators.

The magnetic powder materials are in a non-bonded, which means that the powder materials may still be in powder form and may be released as a powder in case the compression is removed.

However, by the compression under high pressure the powder material may stay in the compressed shape even if the pressure is released.

Instead of directly pressing the magnetic powder material into a sleeve, it may also be possible to press the powder material first into a desired shape and then put a sleeve around this permanent magnet.

One advantage of the non-bonded magnetic powder material is that the permanent magnet does not contain any binder material. This makes it easy to recycle these magnets. Further, a problem associated with the use of binder material like epoxy is that the magnets will corrode in the outer most layers, and hence the magnetic flux of the magnetic will be reduced. Since in the present invention there is no binder applied to the magnetic powder material, a binder induced corrosion can be avoided.

By the term "hard magnetic powder material" is meant magnetic powder, such as AlNiCo, Ferrites, SmCo, SmFeN, NdFeB, which may be characterized as material having a high coercive force which gives a large magnetic hysteresis.

By the term "soft magnetic powder material" is meant powder materials, such as Fe, Co, Ni, FeSi, $Fe_3P$, or FeNi, which may be characterized as a material that becomes magnetized readily upon application of a magnetic field and that returns to a substantially nonmagnetic condition when the field is removed, i.e. a material having the properties of high magnetic permeability, low coercive force, and low magnetic hysteresis loss.

As claimed, the permanent magnet may comprise combinations of hard and soft magnetic powder materials, whereby it is ensured that various designs dependent on, e.g., the desired coercive properties for the magnet can be obtained. If a compound of hard and soft magnetic powder material is used, the materials are preferably separated in a desired pattern in the sleeve so as to achieve a desired design and functionality of the rotor.

By manufacturing a permanent magnet according to the invention, it is ensured that the density of magnetic powder material is increased and that a stronger magnet can be obtained. By the term "stronger" is meant, for one embodiment of the invention, the remanence of the magnet. It is further ensured that the increased density of the magnetic powder material allows production of operable magnets and in particular permanent magnet rotors of smaller size.

In one aspect of the invention, the density of the compressed magnetic powder material, for example between the first and second caps, is in the range of 5.0 to 8.0 $g/cm^3$, preferably in the range of 6.8 to 7.7 $g/cm^3$, such as 7.3 $g/cm^3$. Hereby, it is ensured that the magnetic powder material is compressed to a degree that it can be formed to magnets with sufficient strength.

For various embodiments of the invention, the size of the hard magnetic powder material particles may be the same as traditional plastic bonded powder.

For various embodiments of the invention, the sleeve is preferably made of stainless steel, but may for other embodiments be made of other materials such as copper, steel, titanium, aluminum, or synthetic materials. Hereby, it is ensured that the magnet, for example as a rotor, can be operated in aggressive environmental conditions, e.g. various kinds of fluids such as water, wastewater, oil, etc. For example, in bio-ethanol, clean fuel, water may be present and therefore, there would be special requirements for the magnets, which require an encapsulation of the magnet. Accordingly, the magnets of the present invention may be suited for those applications.

For one embodiment of the invention, at least one of the first cap and the second cap arranged to close off an inner opening of the first sleeve are locked to the first sleeve.

Locking the cap or caps to the first sleeve may be accomplished in various ways, e.g. by punching a deformation that interlocks the sleeve and cap, by welding, soldering, seaming, by screwing together the cap prepared with a thread and the sleeve prepared with a similar thread, the threads fitting together, etc.

For various embodiments of the invention, the caps are made of material with a thickness in the range of 0.5 to 2.0 mm, such as 1.0 mm.

In another aspect of the invention, the ratio between the apparent density of the magnetic powder material and the compressed density of the magnetic powder material preferably is in the range of 2.0 to 2.9, such as 2.7. Hereby, it is ensured that the magnetic powder material is sufficiently compressed, for example in the sleeve, as to form a desired permanent magnet.

In one aspect of the invention the permanent magnet comprises at least 90 volume %, preferably at least 95 volume %, compressed magnetic powder material without a binder. By providing a permanent magnet, for example as a rotor, with such a high content of compressed non-bonded powder material, it is ensured that a higher magnetic strength (magnetic flux) of the permanent magnet—and hereby the rotor—is achieved, preferably near its maximum.

In another aspect of the invention the permanent magnet further comprises one or more solid permanent magnet bodies. Solid permanent magnet bodies can be, for example, iron parts, sintered magnets, non-magnetic bodies, etc. Hereby, it is ensured that the rotor can be constructed in a desired way with the physical and functional properties desired.

In a further aspect of the invention the non-bonded magnetic powder material composes an anisotropic magnet. Hereby it is ensured that a powerful magnet is provided with the special properties of an anisotropic magnet.

In another aspect of the invention at least one of the first and second caps is formed to compose a rotor shaft. By composing the rotor shaft to be a part of at least one of the caps, the cost of a separate rotor shaft can be avoided, ensuring a minimized production cost. Furthermore, it is ensured that no weak seam arises between the cap and a separate rotor shaft assembly, and smaller physical tolerances can be achieved.

In yet another aspect of the invention the rotor further comprises a separate rotor shaft fitted into the sleeve. When a separate rotor shaft is fitted into the sleeve and thereby into the rotor, the fitted cap or caps are adapted to fit both into the sleeve and around the rotor shaft in order to close off the inner opening of the sleeve. As the rotor shaft is to serve as the rotational axis for a rotor in operation, the rotor shaft must be fitted in a way that it is positioned substantially at the center of the rotor. The way the one or more caps are locked to the sleeve can also be applied for locking the cap to the rotor shaft.

In a further aspect of the invention the rotor shaft comprises a hollow rotor tube extending along the full axial length of the rotor shaft, forming a hollow space of the rotor tube and suitable for conveying a fluid along the hollow space. Hereby, it is ensured that, e.g., lubricating oil can be conveyed from one distal end of the rotor shaft to the other, such as to bearings located there, or a pressure gradient in the fluid surrounding the rotor between the two ends can be equalized.

In an even further aspect of the invention the rotor shaft is a worm shaft suitable for being used with a worm pump. Hereby, it is ensured that the rotor can be used in a worm pump type of electrical machine, the type of pump being a highly effective pump capable of providing a relatively high pump pressure. In other embodiments the function of the worm shaft is to create fluid circulation around the rotor.

In another aspect of the invention the first and second caps comprise locking means suitable for locking the caps together inside the space of the first sleeve and keeping the caps positioned in relation to each other. By locking the first and second caps together inside the sleeve during pressing, it is ensured that the caps mutually keep each other in place with the powder material in a desired compressed condition when no external pressing is applied to the caps.

In yet another aspect of the invention the rotor further comprises a second sleeve having a smaller diameter than the first sleeve and fitted inside the first sleeve. Hereby, it is ensured that it is possible, e.g., to hold and separate the different materials comprised in the rotor or to have spaces without material so as to have a desired filling pattern of the materials in the rotor without the materials mixing. Furthermore, the second sleeve can hold solid materials, such as iron parts, sintered magnets, non-magnetic bodies, a rotor shaft, etc., or a pre-pressed magnet made of magnetic powder material with or without a binder material.

In a further aspect of the invention the first sleeve is formed as one cylindrical sleeve. By having the first sleeve made of one cylindrical sleeve, it is ensured that leakages at joints on the sleeve surface are avoided. It is further achieved that complicated assembly procedures of the sleeve can be excluded.

In additional aspects of the invention the sleeve has a substantially uniform wall thickness. By using a sleeve with a substantially uniform wall thickness in manufacturing the rotor, it is ensured that an alignment of the rotor is optimized. For various embodiments the sleeve is furthermore suitable for deformation. For various embodiments of the invention, the thickness of the sleeve is in the range of 0.1 to 1.0 mm, such as 0.4 mm.

In another aspect of the invention the first sleeve is manufactured from one cylindrical sleeve of a substantially uniform wall thickness, and the diameter of the inner opening of the first sleeve, at first positions where the caps are locked to the first sleeve, is smaller than the diameter of the inner opening of the first sleeve at second positions between the first positions, such as halfway between the caps. Hereby, it is ensured that a rotor with suitable dimensions is provided.

Preferably, the magnetic powder used to produce the permanent magnet according to the invention is an isotropic magnetic powder. Alternatively, an anisotropic magnetic powder may be used. In case an isotropic magnetic powder is used, it is possible to produce an anisotropic magnet by use of this isotropic magnetic powder if the magnetic powder is heated when compressing it. During compression of the magnetic powder additionally a magnetic field may be applied onto the magnetic powder. By this method it is possible to produce an anisotropic magnet from an isotropic magnetic powder, i.e. the isotropic magnetic powder is transformed into an anisotropic permanent magnet.

Further, the invention refers to a method for manufacturing a permanent magnet according the description above. According to this method a magnetic powder material not containing any binder material is compressed into the desired shape of a permanent magnet. The magnetic powder material may contain hard and/or soft magnetic powder material. The powder material may be compressed by high pressure, preferably more than 1000 MPa, further preferably more than 1500 MPa or 2500 MPa or more. By this, a high density of magnetic material inside the permanent magnet is achieved. After compressing the powder material, magnetic poles may be provided inside the material by magnetization. Further, it may possible to encapsulate the permanent magnet. This may be done by directly pressing the powder material inside an encapsulation, for example a sleeve. Further, it may be possible to apply a surface treatment to the surface of the compressed powder material, for example by attaching a coating to this surface. Further, it may be possible to put the compressed permanent magnet inside a sleeve or encapsulation.

In a preferred embodiment the method is a method for manufacturing a permanent magnet rotor for a machine comprising the steps of:

providing a first sleeve, fitting a first cap into the first sleeve to close off the inner opening of the first sleeve at a first position, filling a magnetic powder material into the first sleeve, the magnetic powder material comprising hard magnetic powder material, and/or soft magnetic material or a combination of hard and soft magnetic material, fitting a second cap into the first sleeve to close off the inner opening of the first sleeve at a second position, the magnetic powder material being situated between the first position and the second position, applying pressure to at least one of the first and second caps in the first sleeve, the pressure being applied toward the other of the first and second caps, so as to compress the magnetic powder material therebetween, and preferably the additional step of:

while maintaining the applied pressure, locking at least one of the first and second caps in position with respect to the first sleeve, so that both first and second caps are locked in position with respect to the sleeve, whereby the magnetic powder material remains compressed when the pressure is relieved.

By the term "magnetic powder material" is meant hard magnetic powder material or soft magnetic material or a combination of hard and soft magnetic materials.

By manufacturing a permanent magnet rotor according to the invention, it is ensured that the density of the magnetic powder material comprised in the sleeve is increased as it is compressed. Furthermore, it is ensured that by locking the caps in position while the magnetic powder material is in a compressed state, the spring back effect of the compressed magnetic powder material is minimized, providing an even higher density of the magnetic powder material in the sleeve. This in turn facilitates rotors of smaller size compared with rotors with bonded magnets.

For various embodiments of the invention, the sleeve can be made of materials such as stainless steel, copper, steel, titanium, aluminum, or synthetic materials. Hereby, it is ensured that the rotor can be operated in aggressive environmental conditions, e.g. various kinds of fluids, such as water, wastewater, oil, etc. In bio-ethanol (clean fuel) water may be present, and therefore there would be special requirements for the magnets, i.e. they require an encapsulation. Accordingly, the magnets of the present invention may be suited to those applications.

Locking the cap or caps in position with respect to the first sleeve may be accomplished in various ways, e.g. by punching a deformation that interlocks the sleeve and cap, welding, soldering, or seaming the cap and sleeve together, by screwing together the cap prepared with a thread and the sleeve prepared with a similar thread, the threads fitting together, etc. The locking for various embodiments may be performed only partly while the applied pressure is maintained, whereby the locking in turn can be performed in full when the pressure is removed. Hereby, it is ensured that the working process of manufacturing is simplified and also that the machinery required here for is simplified.

Even further it is ensured for various embodiments that use of binder additive in the magnetic powder material can be elided, which in turn facilitates a higher density of the magnetic powder material comprised in the sleeve.

In one aspect of the method, the density of the compressed magnetic powder material between the first and second caps is in the range of 5.0 to 8.0 $g/cm^3$, preferably in the range of 6.8 to 7.7 $g/cm^3$, such as 7.3 $g/cm^3$.

In another aspect of the invention, the compression ratio of the magnetic powder material can be in the range of 2.0 to 2.9 such as 2.7.

For one embodiment of the invention the applied pressure to at least one of the first and second caps at its maximum preferably is in the range of 400 MPa to 2000 MPa, preferably in the range of 400 MPa to 1200 MPa. Hereby, it is ensured that the magnetic powder material inside the sleeve between the caps is sufficiently compressed.

In one aspect of the invention the compressed magnetic powder material comprises at least 90 volume %, preferably at least 95 volume % compressed non-bonded powder material. By providing a permanent magnet rotor with such a high content of magnetic powder material, it is ensured that the magnetic strength of the rotor is increased and near its maximum. In another aspect of the invention, at least a part of the first sleeve is permanently expanded when the pressure is applied to at least one of the first and second caps in the first sleeve, the part of the first sleeve being a part between the first cap and the second cap. Hereby, it is ensured that the sleeve, and thereby the rotor, is manufactured to the exact dimensions required, such as if the sleeve is expanded inside a die with the required dimensions.

In yet another aspect of the invention the method further comprises the step of fitting a rotor shaft into the sleeve. When a separate rotor shaft is fitted into the sleeve and thereby into the rotor, the fitted cap or caps are adapted to fit both into the sleeve and around the rotor shaft in order to close off the inner opening of the sleeve. As the rotor shaft is to serve as the rotational axis for a rotor in operation, the rotor shaft must be fitted in a way that it is positioned substantially at the center of the rotor, when the manufacturing of the rotor has been accomplished, so as to achieve a good balancing of the rotor. The methods for locking the one or more caps in position with respect to the first sleeve can also be applied for locking the cap in position with respect to the rotor shaft. Hereby, it is ensured that a substantially complete rotor has been manufactured through an advantageous method and, as no or only a few further steps are required in the manufacturing process, the method thereby is time saving and cost optimized.

In a further aspect of the invention the magnetic powder material comprises a lubricant additive. By adding a lubricant additive to the magnetic powder material, it is ensured that during the process of pressing, the particles of the powder do not scratch, e.g., the sleeve on its inside. Furthermore, the powder material slides more easily in the sleeve, and less pressure is needed for the pressing.

In an even further aspect of the invention a further portion of magnetic powder material comprising a binder additive is provided in the sleeve between the first and second cap. By adding a binder additive, it is ensured that the magnetic powder material is kept substantially compact, even if the pressure on the caps is released or even altered before the caps are locked with respect to the sleeve.

In another aspect of the invention the method further comprises the step of fitting one or more solid permanent magnet bodies into the sleeve. Solid bodies can be, for example, iron parts, sintered magnets, non-magnetic bodies, or pre-pressed magnets, with or without a binder material. Hereby, it is ensured that the rotor can be constructed in a desired way with the physical and functional properties desired.

In an additional aspect of the invention the first and second caps comprise locking means and are locked together and kept positioned in relation to each other inside the first sleeve, when the pressure is applied to at least one of the first and second caps in the first sleeve. Hereby, it is ensured that the caps are kept in place with the powder material compressed, even if the pressure on the caps is released before the caps are locked with respect to the sleeve.

In another aspect of the invention the method further comprises the step of fitting a second sleeve having a smaller diameter than the first sleeve inside the first sleeve. Hereby, it is ensured that a sleeve can be fitted that might have the function of, e.g., holding and separating different materials filled into the rotor or to create spaces without material, so as to achieve a desired filling pattern of the materials in the rotor.

Furthermore, the second sleeve can hold solid materials, such as iron parts, sintered magnets, non-magnetic bodies, a rotor shaft or pre-pressed magnets, with or without a binder material.

In another aspect of the invention the method further comprises the step of filling magnetic powder material into the second sleeve. Hereby, it is ensured that a sleeve can be fitted that might have the function of, e.g., holding and separating different magnetic powder materials filled into the rotor, so as to achieve a desired filling pattern of the materials in the rotor, e.g. without them getting mixed during filling and/or pressing. Furthermore, the second sleeve can hold solid materials, such as iron parts, sintered magnets, non-magnetic bodies, a rotor shaft, etc.

In a further aspect of the invention the method further comprises the step of lubricating at least one of the first and second sleeves on its surface before the step of filling magnetic powder material into the sleeve. By lubricating at least one of the sleeves, it is ensured that during the process of pressing, the particles of the magnetic powder material do not scratch the sleeve on its inside. Furthermore, the magnetic powder material slides more easily in the sleeve, and less pressure is needed for the pressing.

In an even further aspect of the invention the method further comprises the step of placing the rotor in a magnetic field when performing the step of applying pressure to at least one of the first and second caps in the first sleeve, so as to form an anisotropic magnet of the magnetic powder material filled into the first sleeve. Hereby, it is ensured that a step of magnetizing the rotor is performed simultaneously with the pressing, which in turn saves manufacturing time as a following magnetization procedure is avoided. Furthermore, stronger magnetic fields of the magnets can be achieved and permanent magnets with specific properties can be provided.

In further aspects of the invention the method further comprises the step of vibrating the magnetic powder material after it has been filled into the sleeve and before applying pressure to at least one of the first and second caps. By vibrating the magnetic powder material in the sleeve, it is ensured that the magnetic powder material can be compressed to a higher density in the sleeve, which in turn ensures a rotor with higher magnetic strength. Vibration of the powder can be performed, e.g., by mechanical vibration or by ultrasound vibration.

In another aspect of the invention the method further comprises the step of pre-pressing the magnetic powder material filled in the first sleeve before fitting a second cap into the first sleeve to close off the inner opening of the first sleeve. By pre-pressing the powder material before fitting the second cap, it is ensured that only the last part of compressing the powder is performed with the cap. This in turn means that the travel of the cap in the sleeve with applied pressure is decreased, which means that the risk of deforming the cap is also decreased. Furthermore, suitable space for the second cap is made in the magnetic powder material.

Further, the magnet according to the invention may be manufactured in a multi-pressing procedure. For example, a first part of the magnet, for example a first layer or portion, may be pressed in a first step, and then hereafter a second part is pressed in a second pressing step, and so on. By pressing the permanent magnet in several steps, it will be possible to produce a permanent magnet in a complex shape and having zones or parts of different materials inside. For example, there may be zones of hard magnetic material and zones of soft magnetic material. After the several pressing steps all parts or layers of the magnet may receive a further compressing step in which the final density of the material is achieved. Further, the different layers or parts in this final compressing step may be attached to one another, and a homogenous density may be achieved.

In yet another aspect of the invention the method further comprises the step of pre-pressing the magnetic powder material filled in the second sleeve before fitting the second cap into the first sleeve.

The invention also relates to a manufacturing system suitable for manufacturing a permanent magnet rotor according to the method claims.

In one aspect of the invention the system comprises a die suitable for performing a step of holding the sleeve of the permanent magnet rotor at least when the pressure is applied to at least one of the first and second caps in the first sleeve. Hereby, it is ensured that the components are held secure during pressing. For various embodiments it is furthermore ensured that e.g. the first sleeve can not expand further than to reach the inner surface of the die if it should expand e.g. during pressing.

In a further aspect of the invention the die comprises an inner part that is shaped to allow the sleeve to expand to the walls of the shaped inner part when the pressure is applied to at least one of the first and second caps in the first sleeve. Hereby, it is ensured that a desired rotor with the desired dimensions can be manufactured.

In another aspect of the invention the system comprises a die suitable for performing the step of holding the sleeve of the permanent magnet rotor, at least while locking the at least one of the first and second caps to the first sleeve. Hereby, it is ensured that the locking can be performed securely and accurately, so as to ensure that the magnetic powder material stays compressed and the caps are locked in their desired positions.

In yet another aspect of the invention the die is lubricated before performing the step of holding the sleeve of the permanent magnet rotor. By lubricating the die before holding the components, it is ensured that the die does not scratch the outer surface of the first sleeve, e.g. if the material of the sleeve expands during pressing and reaches the inner surface of the die.

In a further aspect of the invention the system comprises at least one punch arranged for applying the pressure to at least one of the first and second caps in the first sleeve. Hereby, it is ensured that the cap can be positioned properly and that a sufficient pressure for compressing the powder material is applied.

In an even further aspect of the invention, the die comprises magnetization means prepared for magnetizing the hard magnetic powder material, when the pressure is applied to at least one of the first and second caps in the first sleeve, so as to establish at least one anisotropic magnet in the sleeve. Hereby, it is ensured that a rotor comprising an anisotropic magnet can be manufactured and that the special properties of the anisotropic magnet rotor can be utilized.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings:

FIG. 7 illustrates schematically how one of the caps can be locked in position at pressing by a drifted recess in the sleeve and caps according to one embodiment of the invention;

FIG. 8 illustrates schematically how one of the caps can be locked in position at pressing by drifting an inner cannula tube according to one embodiment of the invention;

DETAILED DESCRIPTION OF THE INVENTION

Rotors comprising magnetic powder material are known in the art. Available permanent magnetic materials may comprise Ferrites, AlNiCo, SmCo, and NdFeB. Magnets made of these materials can be manufactured in many ways, but the most selected ways are sintering or bonding.

Sintering is a method for making objects from powder by heating the material until its particles adhere to each other. This heating process must be performed below the melting point of the powder material.

Compression bonded magnets are obtained by compressing a composite that involves a magnetic powder and a polymer binder, such as epoxy, in a mold with the desired size and shape.

One disadvantage of compression bonded magnets of the prior art is that the added binder has no magnetic effect, and therefore the possible strength of the magnet is reduced in relation to a magnet without binder.

One way to try to overcome this effect could be to mechanically compress the composite very hard. Unfortunately, this has a negative effect in that, when releasing the mechanical compression on the composite, it has a spring-back effect, meaning that the composite will not maintain in its fully compressed state, but will re-expand a certain degree when the compression is released. This in turn means that the density of the composite is not at its maximum. By use of the present invention the spring-back effect is minimized.

So when manufacturing, e.g., a permanent magnet rotor comprising bonded magnets manufactured as described above, the maximum magnetization possible of the rotor is not reached.

The present invention relates to various advantageous permanent magnet rotors. The rotors are, in principle, manufactured by pressing caps into a suitable sleeve, comprising magnetic powder material suitable for magnetization, from both ends. The magnetic powder material is pressed to a desired density and, while maintaining the pressure on the caps, the caps are locked at their positions. Hereby, an advantageous rotor is obtained where the magnetic powder material can be pressed to a high density.

Figure 1:
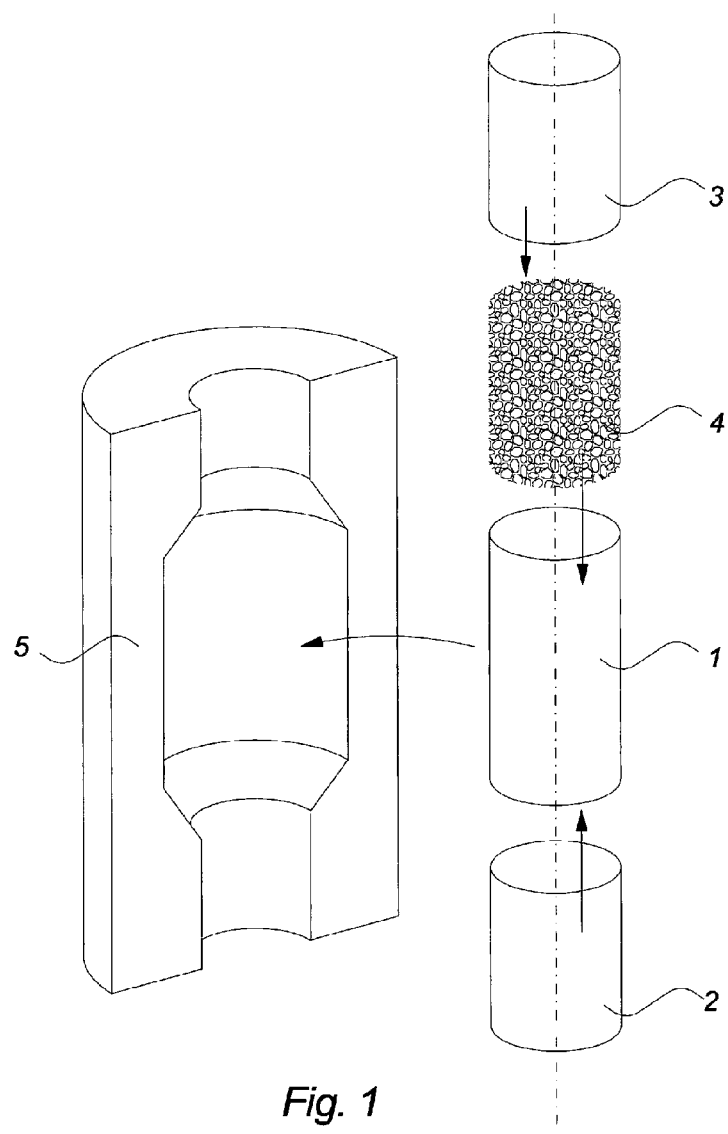
FIG. 1 illustrates schematically the basic components of embodiments of the invention.

FIG. 1 illustrates schematically the basic components of embodiments of the invention.

A rotor according to various embodiments of the invention, comprises at least a first sleeve 1, which for one embodiment of the invention is suitable to be deformed under pressure, a first and a second cap 2, 3, and magnetic powder material 4. During manufacturing the components may be placed in a die 5.

The pressure may be applied to the powder material from different sides. The powder material may be compressed in a sleeve in an axial direction. However, additionally or alternatively, it is also possible to apply a pressure from the side, for example in a radial direction.

The sleeve 1 is preferably being formed as a cylindrical tube.

Figure 2:
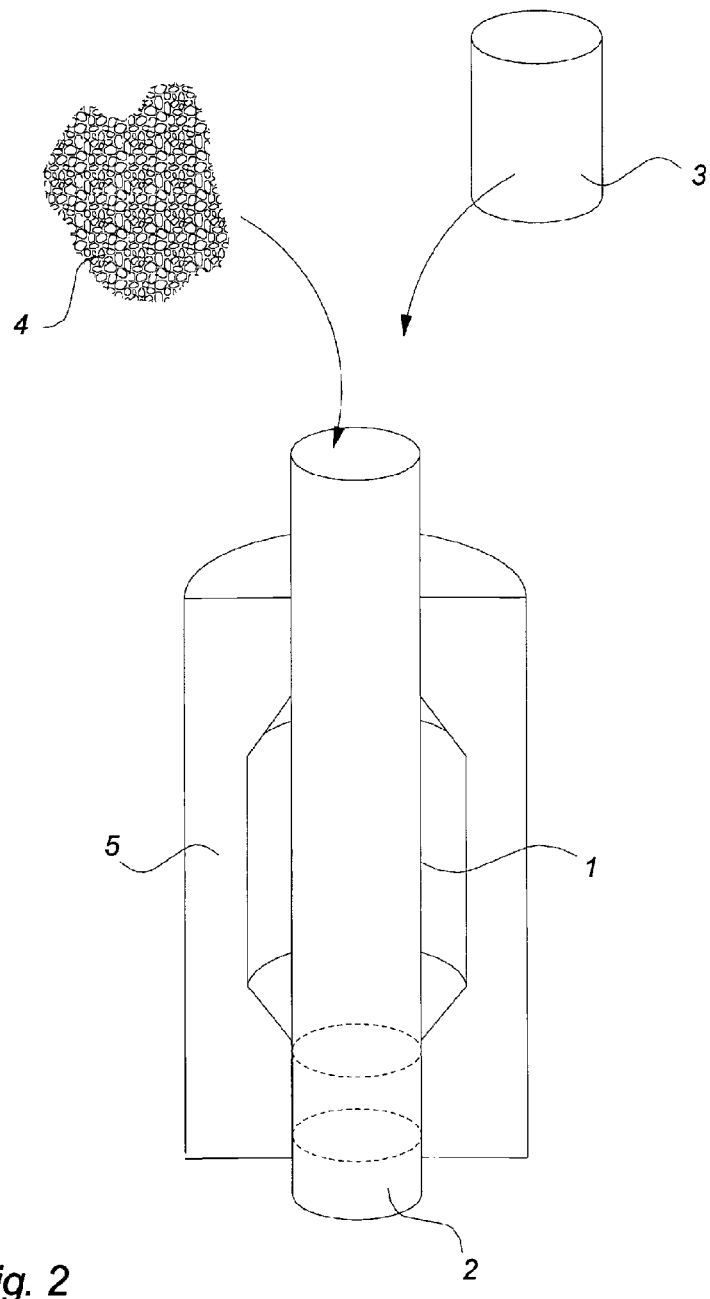
FIG. 2 illustrates schematically basic components of a rotor located in a die before pressing according to one embodiment of the invention.

FIG. 2 illustrates schematically the basic components of a rotor located in a die 5 before pressing according to one embodiment of the invention.

The first sleeve 1 is fitted with a first cap 2 at one position inside the sleeve 1. The dimensions of the cap 2 are such that it closes off the inner opening of the sleeve 1. The sleeve 1 and the cap 2 are hereby forming a tight one-end opened container.

A magnetic powder material 4 suitable for being magnetized is filled into the container in a suitable amount.

A second cap 3 is then fitted to another position inside the sleeve 1, as indicated by an arrow on the figure. The sleeve 1 and the caps 2, 3 are now forming a closed container comprising magnetic powder material 4.

For various embodiments of the invention, the sleeve 1 may be pre-formed, so as to partly or fully fit the inner form of the die 5 before pressing.

Figure 3:
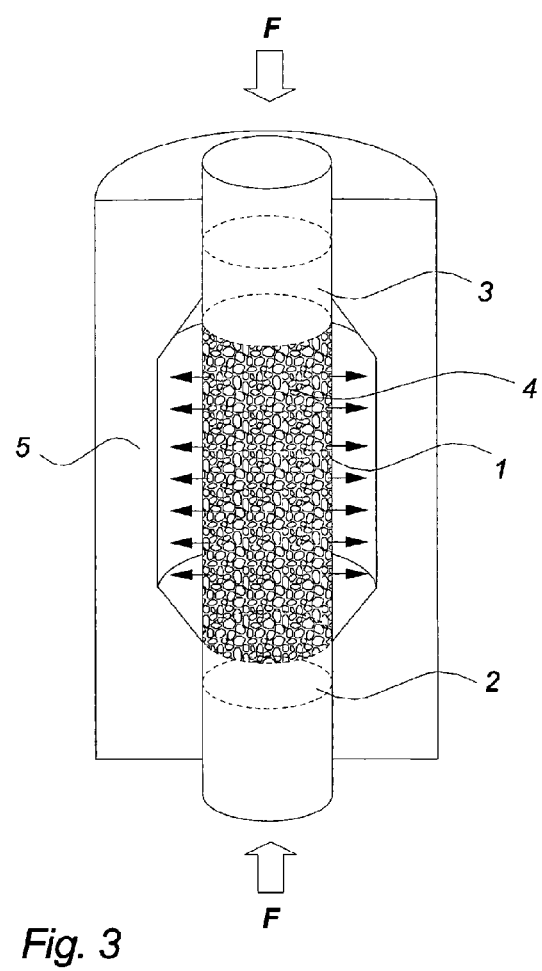
FIG. 3 illustrates schematically basic components of a rotor in a die at pressing according to one embodiment of the invention.

FIG. 3 illustrates schematically the basic components of a rotor in a die at pressing according to one embodiment of the invention.

Pressure schematically illustrated by arrows F on the figure, is applied to one or both caps 2, 3 now fitted in the sleeve 1 after the components have been placed as described in FIG. 2. By applying pressure on the cap or caps, the caps slide toward the center of the sleeve 1, and the powder 4 is compressed.

For various embodiments, the pressure F is so high that it results, at least in part, in a physical extension or deformation of the sleeve 1 as indicated by horizontal arrows on the figure. The sleeve 1 extents to reach the walls of the die 5 and hereby takes the form of the die 5.

For other embodiments of the invention, the sleeve 1 does not deform during pressing.

For various embodiments of the invention, the magnetic powder material 4 is vibrated before it is compressed, e.g. by mechanical vibration or by ultrasound vibration. By exposing the magnetic powder material 4 in the sleeve 1 to suitable vibration, the material 4 is pre-compacted and, e.g., pockets of air in the sleeve 1 are filled.

As indicated on the figure and as previously described, at least one of the caps 2, 3 is slid toward the center of the sleeve 1.

For various embodiments of the invention, the at least one cap 2, 3 is slid such a distance that the cap 2, 3 is at least partly within the area of the sleeve 1 that is deformed during pressing. Thereby, this part of the cap is also deformed along with the sleeve 1. The cap 2, 3 must therefore also be suitable for deformation, at least for this part of the cap.

For various embodiments of the invention, the physical extension of the caps 2, 3 in the longitudinal direction of the rotor can be of different sizes.

For various embodiments at least one of the caps 2, 3 is formed to compose part of the rotor shaft.

For various embodiments at least one of the caps 2, 3 is formed to compose the rotor shaft of a driving machine.

The described magnetic powder material 4 used to be filled into the sleeve is, for various embodiments of the invention, suitable for isotropic or anisotropic magnets. As a natural consequence hereof, the die 5 and other tools and equipment involved in the process of pressing the powder material 4 in the sleeve 1 are suitable for the method used.

Figure 4:
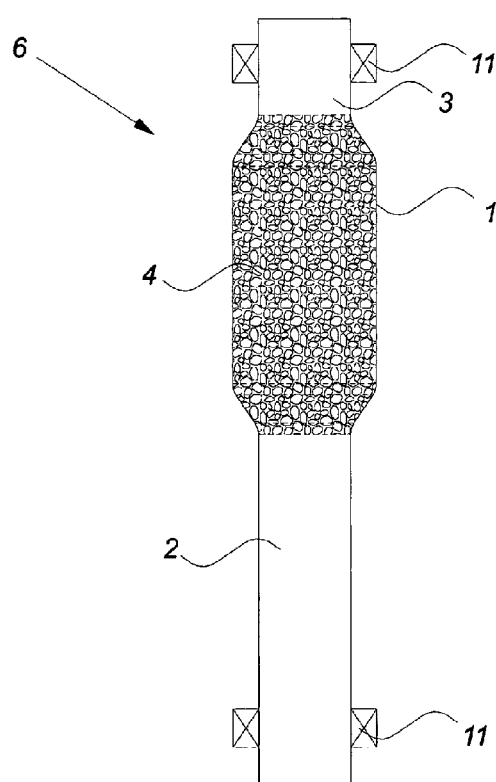
FIG. 4 illustrates schematically a rotor as a product of a pressing according to one embodiment of the invention.

FIG. 4 illustrates schematically a rotor 6 as a product of a pressing according to one embodiment of the invention, as described previously.

For this embodiment it can be seen that the extension of the caps 2, 3 in the longitudinal direction of the rotor is of different lengths, i.e., the first cap 2 is longer than second cap 3.

Furthermore, it can be seen that the caps 2, 3 are formed to compose the rotor shaft.

The longer cap 2 may, e.g., be used as the driving shaft of the rotor, whereas the shorter cap 3 may, e.g., be used to ensure a correct positioning of the rotor, e.g. in a bearing 11 of an electrical machine as indicated on the figure.

Figure 5:
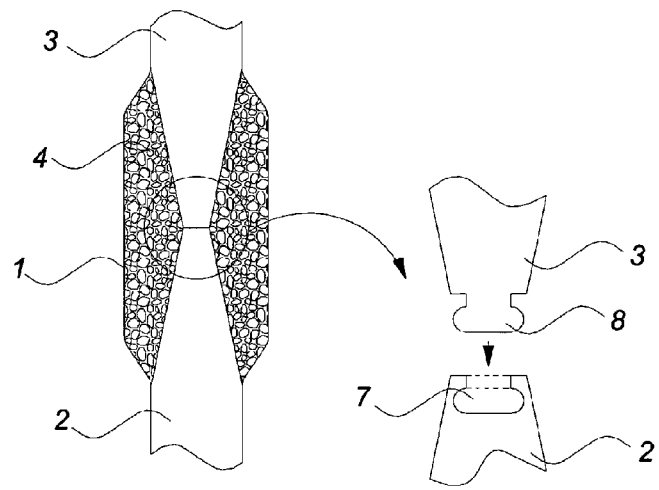
FIG. 5 illustrates schematically how the first and second caps can be joined at pressing according to one embodiment of the invention.

FIG. 5 illustrates schematically how the first and second caps 2, 3 can be joined at pressing according to one embodiment of the invention.

For this illustrative example, the first cap 2 is outlined in a way that it comprises a pointed surface with a distal end directed toward the center of the sleeve 1 before pressing. The second cap 3 is outlined in a similar way, also with a distal end directed toward the center of the sleeve 1 before pressing.

As earlier described, during pressing, pressure is applied to the caps 2, 3, and at least one of the caps slides toward the center of the sleeve 1, and the powder 4 is compressed.

For this embodiment the two pointed surfaces have been constructed such that they will reach each other and be joined when the magnetic powder material 4 has been compressed to the desired density. Furthermore, the two distal ends of the pointed surfaces have a groove 7 and a tongue 8 respectively. They are constructed so that they will engage when the groove 7 and tongue 8 are joined together. Hereby, the caps 2, 3 will be retained in place when the pressing pressure is released.

For various embodiments of the invention, in order to prevent the magnetic powder material 4 from filling the groove 7, taking up the space for the tongue 8, the groove 7 comprises channels (not illustrated) thru which excess powder can be led away.

One advantage of providing the caps 2, 3 with pointed surfaces, as described above, is that during the pressing, powder 4 is pressed toward the inside surface of the sleeve 1 in another pattern as if the pressure is applied, e.g., by caps 2, 3 with flat surfaces in a plane extending radially from the longitudinal axis of the rotor.

Furthermore, the amount of powder 4 to be filled is reduced, as the pointed surfaces takes up some space of the inside of the sleeve 1.

It should be understood that the described joint and engaging of the caps 2, 3 can be used for joining the caps 2, 3 alone or in combination with other methods for joining or locking the caps 2, 3 at a desired position.

Even further the construction of the joint can be outlined in numerous ways.

Figure 6:
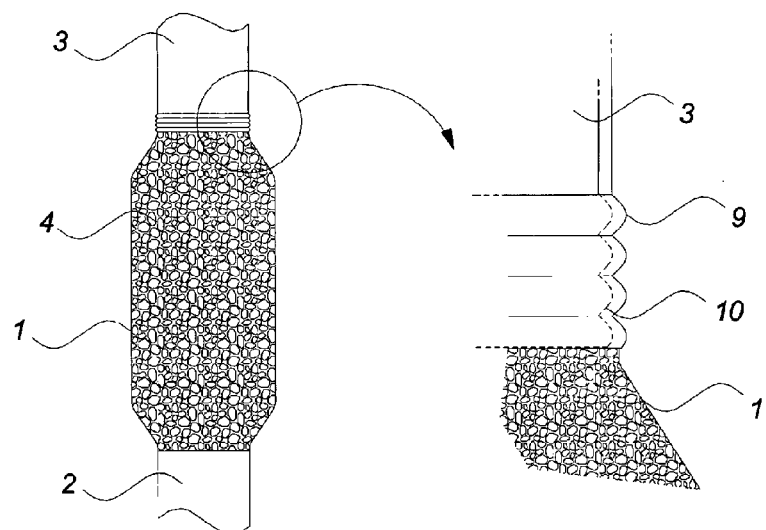
FIG. 6 illustrates schematically how one of the caps can be locked in position at pressing by an inner and an outer thread according to one embodiment of the invention.

FIG. 6 illustrates schematically how one of the caps can be locked in position at pressing by an inner and an outer thread according to one embodiment of the invention.

For this illustrative embodiment of the invention, the sleeve 1 is outlined in a way that it comprises an inner thread 9 at its distal part, i.e. a part of the sleeve that is in overlap with the second cap 3 after pressing. The second cap 3 comprises a complementary outer thread 10 that can engage with the inner thread 9 of the sleeve by turning around its own axis. This ensures that the cap 3 is locked in a desired position in relation to the sleeve 1, e.g. when a desired compression of the powder 4 is reached.

The other distal part of the sleeve 1 and the first cap 2 may be outlined in a similar way.

For other embodiments of the invention, the inner and outer threads 9, 10 are corrugated surfaces that ensure a strong engagement between the caps 2, 3 and sleeve 1.

The engagement of the threads 9, 10 for various embodiments can be done before, during or after pressing the caps 2, 3.

It should be understood that the described method of locking the caps in position can be used alone or in combination with other methods for locking.

FIG. 7 illustrates schematically how one of the caps can be locked in position at pressing by a drifted recess in the sleeve and caps according to one embodiment of the invention.

For this embodiment of the invention, the sleeve 1 and the cap 3 are overlapped when the desired compression of the magnetic powder material 4 is reached during pressing. The cap 3 and sleeve 1 are locked in position with one or more drifted recesses 13 along their overlapped surfaces.

It should be understood that the described method of locking the caps in position can be used alone or in combination with other methods for locking, e.g. welding.

FIG. 8 illustrates schematically how one of the caps can be locked in position at pressing by drifting an inner cannula tube according to one embodiment of the invention.

According to various embodiments of the invention, the rotor comprises an inner cannula tube 14 as illustrated on the figure. The purpose of the tube 14 is to allow access of, e.g., lubricant thru the tube to bearings located at one distal end of the rotor when it is mounted in a machine.

The cannula tube 14 may be installed thru adapted caps 2, 3 comprising a suitable perforation before the pressing sequence. When the compression of the magnetic powder material 4 has reached a desired level during the pressing sequence, the cannula tube 14 is drifted at its ends. Hereby, the distal part of the tube 14 literally bends to the side along the whole periphery of the tube and the diameter of the most distal annulus of the tube is increased whereby it is engaged with the perforation in the adapted caps 2, 3. This in turn results in the caps 2, 3 being locked in position even if the powder material 4 tries to push the caps, e.g. due to springback of the material 4.

The described method of locking the caps 2, 3 in position can be used alone or in combination with other methods for locking.

Figure 9:
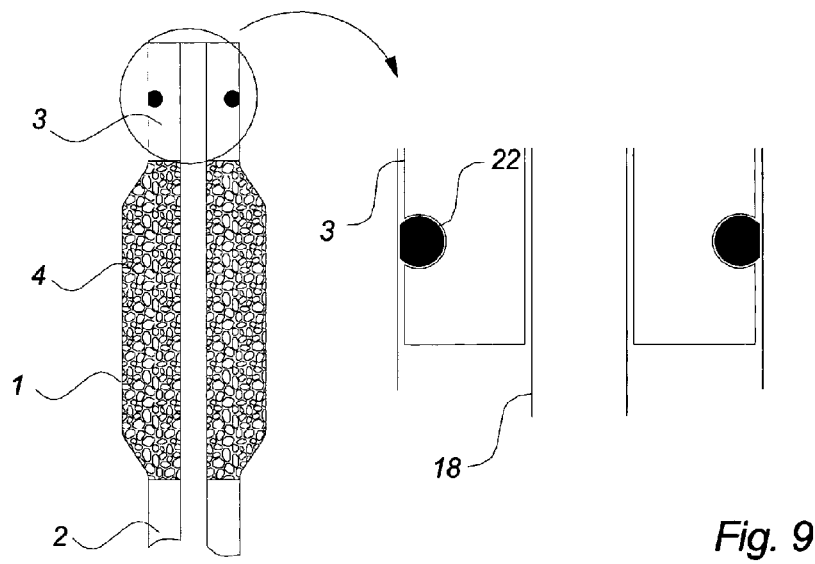
FIG. 9 illustrates schematically according to one embodiment of the invention, a pressed rotor comprising a separate rotor shaft.

FIG. 9 illustrates schematically according to one embodiment of the invention, the use of an O-ring for holding one or more of the caps in the sleeve.

The O-ring is for the illustrated embodiment retained in a groove of the cap and has the function of sealing the material inside the sleeve from impacts from the inside. If the O-ring is dimensioned correctly, it will preferably be compressed at least partly when it is retained in the groove.

Applying an O-ring to lock the caps in position can be performed in a variety of ways, e.g. with or without a groove for retaining the O-ring, but common to them is that the O-ring is inserted between the cap and the inner side of the first sleeve and that the O-ring is applied to the cap or sleeve before or during the manufacturing process.

Figure 10:
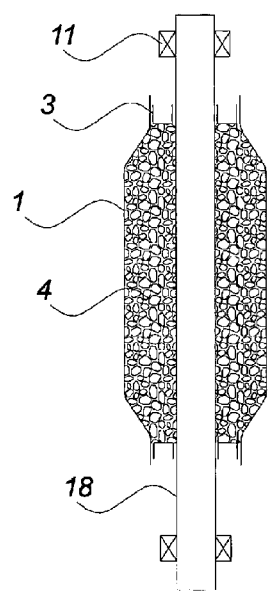
FIG. 10 illustrates schematically according to one embodiment of the invention, with one sharp, two bearings and caps.

FIG. 10 illustrates schematically, according to one embodiment of the invention, a pressed rotor comprising a separate rotor shaft 18.

The rotor shaft 18 in this embodiment is not an integrated part of the caps 2, 3. For this embodiment, the caps 2, 3 are outlined so as to fit into the sleeve 1 and also around the separate rotor shaft 18. The means for pressing on the caps 2, 3 are naturally specifically constructed in relation hereto. Furthermore, various ways of, e.g., locking the caps 2, 3 to the sleeve 1 during pressing can be implemented for this embodiment. Even further similar locking methods can be used to lock the center portion of the caps 2, 3 to the separate rotor shaft 18.

The rotor shaft 18 may for various embodiments be solid, hollow, closed, or comprise, e.g., a cannula tube similar to the one described in FIG. 8.

Figure 11:
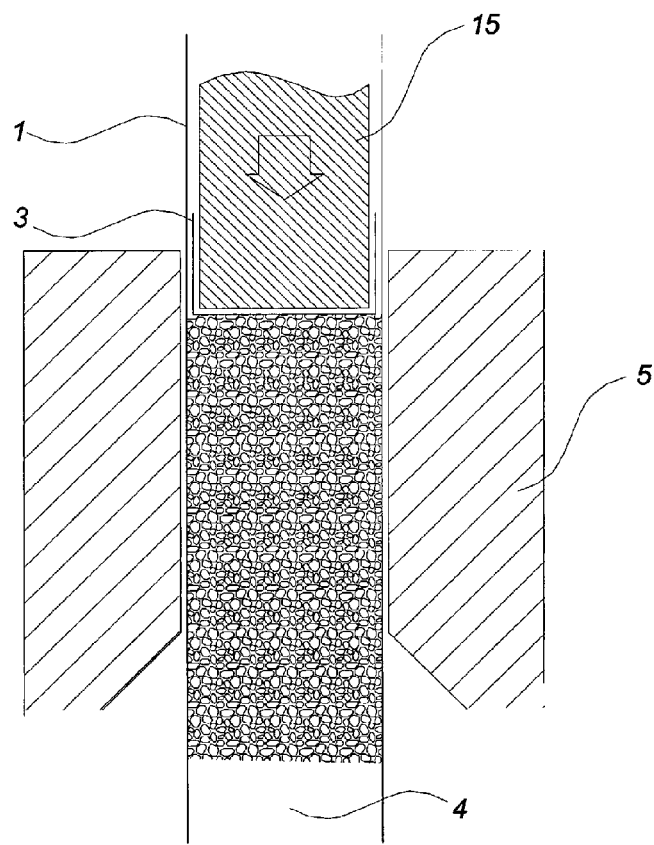
FIG. 11 illustrates schematically the components of the rotor situated in the die immediately before pressing according to one embodiment of the invention.

FIG. 11 illustrates schematically the components of the rotor situated in a die immediately before pressing. The sleeve 1 and the cap 3 are filled with a predetermined amount of magnetic powder material 4 in an uncompressed state. During the pressing process a punch 15 will apply a pressure on the cap 3 and magnetic powder material 4 will compress in the sleeve 1.

For various embodiments of the invention, the punch 15 can be controlled in relation to, e.g., the pressure applied and pressure time. The applied pressure may be varied over time, such as in a sinusoidal manner with increasing amplitude.

The die 5 and punch 15 must be constructed as to be able to handle various compression ratios of the magnetic powder material 4, which for various materials may be in the order of, e.g., 2.0 to 2.8, such as 2.7.

Figure 12:
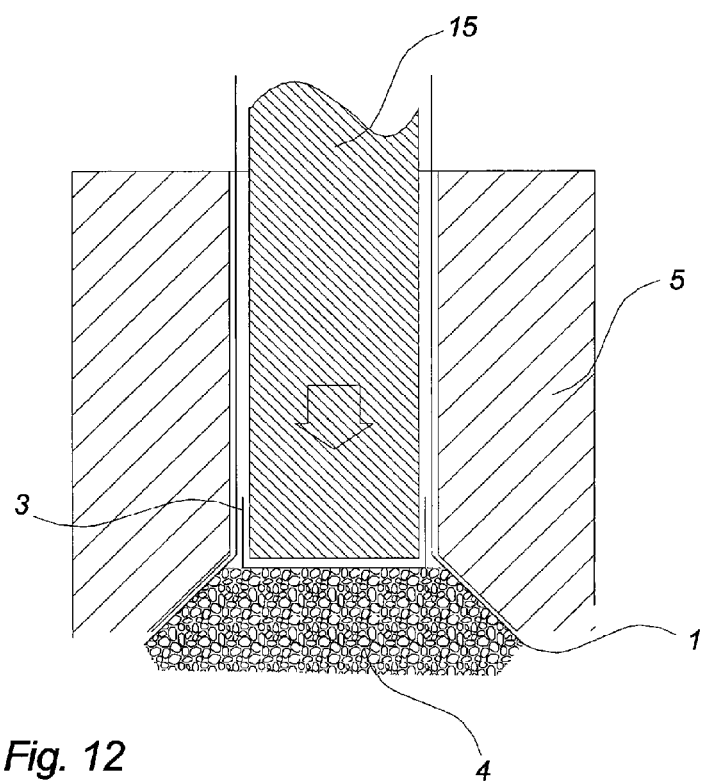
FIG. 12 illustrates schematically how the punch causes magnetic powder material to compress and the sleeve to extend to the die according to one embodiment of the invention.

FIG. 12 illustrates schematically how the punch 15 causes magnetic powder material 4 to compress and how the sleeve 1 extends to the die. The magnetic powder material 4 is compressed to a desired level and the cap 3 is ready for being locked at the desired position.

As also indicated on the figure, the sleeve 1 and/or a distal part of the cap 3 are extended under the applied pressure from the punch 15 so that they reach the walls of the die 5.

Figure 13:
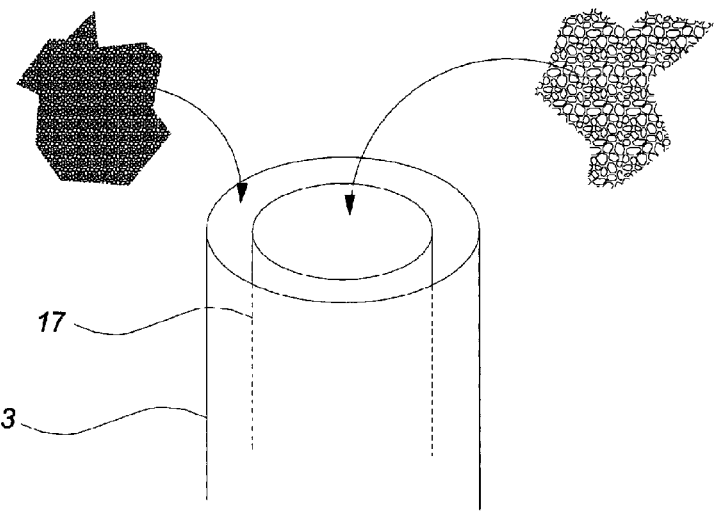
FIG. 13 illustrates schematically an embodiment of the invention comprising a second sleeve.

FIG. 13 illustrates schematically an embodiment of the invention comprising a second sleeve.

The second sleeve 17, having a smaller diameter than the first sleeve 1, is placed inside the first sleeve 1 located, e.g., in the die 5. The two spaces now occurring can be filled with similar or different kinds of magnetic powder materials 16a, 16b, so as to provide a rotor with specific characteristics.

For various embodiments of the invention, the size and form of the second sleeve 17 can be altered, e.g. the form does not necessarily take a cylindrical shape but can be squared, rectangular, elliptical, or other forms. Furthermore, the axial length of the second sleeve 17 need not be the same as the first sleeve 1.

Figure 14:
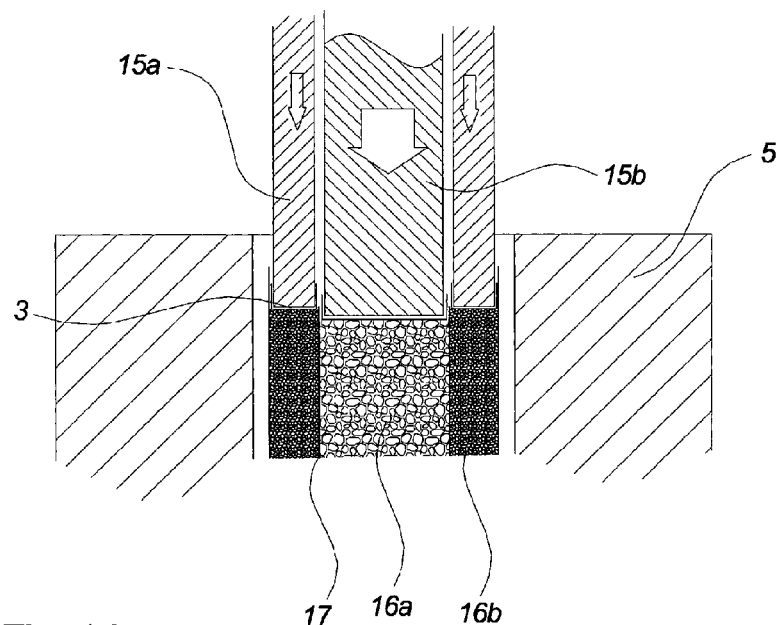
FIG. 14 illustrates schematically pressing of a rotor according to an embodiment of the invention comprising a second sleeve.

These embodiments may require a special pressing sequence and punches 15a, 15b, as schematically illustrated in FIG. 14.

In order not to press on and deform the second sleeve 17, the die 5 and punches 15a, 15b may be constructed in a way that the separate spaces of powder 16a, 16b can be compressed separately and/or sequentially.

As illustrated in FIG. 14, the punch may be constructed of, e.g., two punch parts 15a, 15b. As indicated by arrows on the punch parts, different levels of pressure can be applied to each of the punch parts 15a, 15b, and they can be moved separately.

The same punch 15 and die 5 may for various embodiments be used when pressing a rotor with only the first sleeve 1. This embodiment is not illustrated. For this situation the axial pressing forces are converted to radial forces in an advantageous way. This split pressing may be utilized to achieve an alternative pressing pattern, where segments of the magnetic powder material 4 can be compressed before others, which may result in a minimized scratching by the magnetic powder material 4 of the inside of the sleeve 1, and lubricants may be avoided. Furthermore, if more than one magnetic powder material 4 is filled in the sleeve 1, the split pressing can be utilized, so as to substantially compress the different magnetic powder materials 4.

All the figures described above show a magnetic powder material 4. It must be emphasized that a broad range of various powder and solid materials can be filled into the sleeves of various embodiments described.

Figure 15:
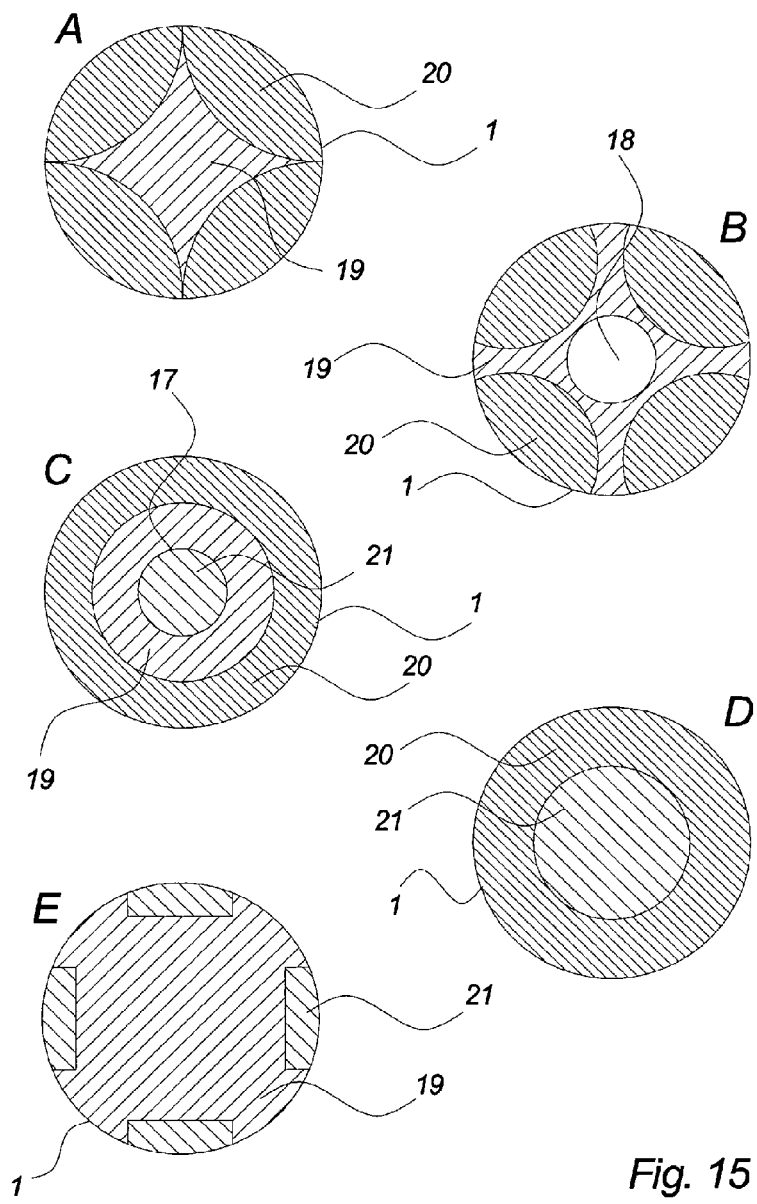
FIG. 15 illustrates schematically various rotor constructions A-E according to various embodiments of the present invention.

A few illustrative examples are disclosed in FIG. 15, which illustrates schematically various rotor constructions according to various embodiments of the present invention.

Embodiment A illustrates schematically an embodiment comprising a portion of soft magnetic material 19 and a portion of hard magnetic powder material 20 embedded in a sleeve 1. The soft magnetic material powder portion 19 composes the core of the rotor but with "tongues" extending substantially to reach the sleeve 1.

Embodiment B illustrates schematically an embodiment comprising a portion of soft magnetic powder material 19 and a portion of hard magnetic powder material 20 embedded in a sleeve 1 in a similar way as described in embodiment A. Furthermore, a rotor shaft 18 is for this embodiment embedded in the soft magnetic powder material 19 at the center of the sleeve 1.

Embodiment C illustrates schematically an embodiment comprising soft magnetic and hard magnetic powder materials 19, 20 embedded in a first sleeve 1. The materials 19, 20 are composed in the sleeve as annuli with the hard magnetic powder material 20 at the periphery closest to the first sleeve 1. Furthermore, a solid material 21 in a second sleeve 17 is embedded substantially at the center of the first sleeve 1. The solid material 21 may for various embodiments be composed of, e.g., stainless steel, ferritic steel, ceramic, etc.

Embodiment D illustrates schematically an embodiment of a solid material 21 embedded in the center of the sleeve 1, surrounded by hard magnetic powder material 20.

Embodiment E illustrates schematically an embodiment where suitable bars of solid material 21 are placed at desired positions along the inner periphery of the sleeve 1 and the rest of the space is filled with soft magnetic powder material 19.

The filling process of the sleeves with the powder and solid materials according to the schematically illustrated embodiments may require specialized tools and equipment.

The types of solid material 21 may for various embodiments of the invention comprise pre-pressed powder material of, e.g., soft magnetic material or hard magnetic material, sintered or not sintered materials, or molded material. This embodiment E may, e.g., be used for magnet couplings.

In general, a lubricant can be used during the pressing process in order to minimize friction between grains of the powder material 4 and other components of the rotor, such as the sleeve 1, the caps 2, 3 or a rotor axis 18. Such friction may leave scratches on the surface of the components.

For various embodiments of the present invention, a lubricant additive is added to the powder material 4 prior to filling the powder into the sleeve 1.

For further embodiments, before pressing, a lubricant is added to the surface of one or more components of the rotor, such as a sleeve 1, the caps 2, 3 and/or a rotor axis 18.

In an even further embodiment the inner surface of the die 5 is lubricated before the components of the rotor are placed in it before the pressing process.

In another embodiment the outer surface of the first sleeve 1 is lubricated before it is places in the die 5 before the pressing process.

Also, in general, the description has disclosed various embodiments of methods for locking, joining together or engaging the components, i.e., the caps 2, 3 to the sleeves 1 and 17 and/or to a separate rotor axis 18. One further embodiment is to weld the components (not illustrated). Welding the components can for various embodiments be performed either by spot- or full-welding, such as by laser-welding.

A full-welding of the components may for one embodiment be performed at pressing when the caps are located at their correct final positions.

For another embodiment of the invention a spot-welding may be performed at pressing when the caps are located at their correct final position.

For various embodiments the full- or spot-welding may be performed after the pressing sequence and after the punch 15 has been released.

All mentioned welding embodiments, may be used in combination to other of the previously described methods for locking, joining and/or engaging the components of the rotor.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A permanent magnet rotor comprising:
   a first sleeve,
   a first cap and a second cap arranged to close off an inner opening of the first sleeve, and
   a permanent magnet formed in an inner opening of the sleeve between the first cap and the second cap and comprising a compressed, non-bonded magnetic powder material selected from hard magnetic powder material, soft magnetic powder material, and combinations of hard and soft magnetic powder materials.

2. The permanent magnet rotor according to claim 1, wherein at least one of the first and second cap is formed to compose a rotor shaft.

3. The permanent magnet rotor according to claim 1, wherein the rotor further comprises a separate rotor shaft fitted into the sleeve.

4. The permanent magnet rotor according to claim 2, wherein the rotor shaft comprises a hollow rotor tube extending along a full axial length of the rotor shaft, forming a hollow space of the rotor tube and suitable for conveying a fluid along the hollow space.

5. The permanent magnet rotor according to claim 1, wherein the first and second caps comprise means for locking the caps together inside a space of the first sleeve and for keeping the caps positioned in relation to each other.

6. The permanent magnet rotor according to claim 1, wherein the rotor further comprises a second sleeve having a smaller diameter than the first sleeve and being fitted inside the first sleeve.

7. The permanent magnet rotor according to claim 1, wherein the first sleeve has a form of a cylindrical sleeve.

8. The permanent magnet rotor according to claim 1, wherein the first sleeve comprises a cylindrical sleeve having a substantially uniform wall thickness, and a diameter of the inner opening of the first sleeve at first positions where the caps are locked to the first sleeve is smaller than a diameter of the inner opening of the first sleeve at second positions between the first positions, optionally halfway between the caps.

* * * * *